(12) United States Patent
Viswanathan et al.

(10) Patent No.: US 10,013,185 B2
(45) Date of Patent: Jul. 3, 2018

(54) MAPPING SYSTEMS AND METHODS OF AN ACCELERATED APPLICATION-ORIENTED MIDDLEWARE LAYER

(71) Applicants: Srinivasan Viswanathan, Fremont, CA (US); Jagannathdas Rath, Bengaluru (IN)

(72) Inventors: Srinivasan Viswanathan, Fremont, CA (US); Jagannathdas Rath, Bengaluru (IN)

( * ) Notice: Subject to any disclaimer, the term of this patent is extended or adjusted under 35 U.S.C. 154(b) by 0 days.

(21) Appl. No.: 15/222,918

(22) Filed: Jul. 28, 2016

(65) Prior Publication Data

US 2017/0206025 A1 Jul. 20, 2017

Related U.S. Application Data

(63) Continuation-in-part of application No. 14/214,611, filed on Mar. 14, 2014, now Pat. No. 9,432,485.

(60) Provisional application No. 61/793,228, filed on Mar. 15, 2013.

(51) Int. Cl.
*G06F 3/06* (2006.01)
*G06F 12/0806* (2016.01)

(52) U.S. Cl.
CPC ............ *G06F 3/0613* (2013.01); *G06F 3/065* (2013.01); *G06F 3/067* (2013.01); *G06F 3/0619* (2013.01); *G06F 12/0806* (2013.01); *G06F 2212/621* (2013.01)

(58) Field of Classification Search
CPC ...... G06F 3/0613; G06F 3/0619; G06F 3/065; G06F 3/067

USPC ..... 709/212, 217, 218, 223, 226; 718/1, 104
See application file for complete search history.

(56) References Cited

U.S. PATENT DOCUMENTS

| 7,548,975 B2 * | 6/2009 | Kumar | G06F 3/0601 709/223 |
|---|---|---|---|
| 2004/0123017 A1 * | 6/2004 | Henry | G06F 3/0607 711/6 |
| 2010/0235832 A1 * | 9/2010 | Rajagopal | G06F 3/0605 718/1 |
| 2011/0179414 A1 * | 7/2011 | Goggin | G06F 3/061 718/1 |

OTHER PUBLICATIONS

"Virtual ID Routing: A Scalable Routing Framework with Support for Mobility and Routing Efficiency" —Lu et al, Department of Computer Science, Univ. of Minnesota—Twin Cities, Jan. 8, 2008. http://conferences.sigcomm.org/sigcomm/2008/workshops/mobiarch/papers/p79.pdf.*

* cited by examiner

*Primary Examiner* — Randy Scott

(57) ABSTRACT

In an embodiment, a mapping method of an accelerated application-oriented middleware layer is provided. The method includes, using a first mapper, determining for an input output operation whether a data storage location has been designated for storing a corresponding data in a virtual storage object, the input output operation involving the corresponding data. The method further includes, using the first mapper and at least one processor, acquiring the virtual element identification of the corresponding data. The method also includes, using the virtual element identification and the corresponding data, performing the input output operation.

15 Claims, 12 Drawing Sheets

| Object class | Allowed Types |
|---|---|
| STO | ext3, proxy |
| STO | nfs, proxy |
| STO | autofs, proxy |
| STO | dgp |
| STO | xfs, proxy |
| STO | ext4, proxy |
| VSTO | Regular |
| VSTO | passthrough |
| VSTO | metapass |
| VSTO | cache |
| VSTO | Replica management |
| ADO | passthrough, cached, non-cached |
| ADO | split, cached or non-cached |
| ADO | metapass, concat or non-concat |
| ADO | distributed passthrough |
| ADO | distributed split (for Hadoop) |
| ADO | passthrough, auto-cached |

FIGURE 5

MAPPING SYSTEMS AND METHODS OF AN ACCELERATED APPLICATION-ORIENTED MIDDLEWARE LAYER

CROSS REFERENCE TO RELATED APPLICATIONS

This application claims the benefit of priority from U.S. Provisional Application Ser. No. 61/793,228, which was filed on Mar. 15, 2013, and U.S. patent application Ser. No. 14/214,611, which was filed on Mar. 14, 2014, and which are each expressly incorporated by reference herein in their entirety.

BACKGROUND

Conventional systems for managing data may have limitations with respect to retrieving and accessing data. Improvements may be made that increase speed while maintaining reliability.

SUMMARY

In an aspect, a mapping method of an accelerated application-oriented middleware layer is provided. The method includes, using a first mapper, determining for an input output operation whether a data storage location has been designated for storing a corresponding data in a virtual storage object, the input output operation involving the corresponding data. The method further includes, using the first mapper and at least one processor, acquiring the virtual element identification of the corresponding data. The method also includes, using the virtual element identification and the corresponding data, performing the input output operation.

The first mapper may be a passthrough mapper and the data storage location may be a metachunk. The method may further include, when the corresponding data is stored in a passthrough virtual storage object and not in a cache virtual storage object, accessing the corresponding data from the passthrough virtual storage object. The method may also include creating a metachunk that has a metachunk virtual element identification, the metachunk being stored in the cache virtual storage object, wherein the metachunk includes the corresponding data. The method may further include storing in the passthrough mapper an association between the corresponding data and the metachunk virtual element identification number.

The method may further include creating a first level subchunk of the metachunk, creating a second level subchunk of the first level subchunk, and storing the corresponding data in the second level subchunk. This subchunk is a basically a block or group of blocks that exist within the first level subchunk.

In case of the first mapper being a cache mapper, a metachunk once created will also have an in-memory as well as persistent section to store the corresponding attributes/properties of the real file. Whenever an Attribute Operation (eg. Getattr, Setattr etc.) request comes for a particular file, and the metachunk exists for that file, then the cache mapper redirects the requests to the metachunk. And it will be served from the cache, thereby increasing the performance of Attribute operations also.

In some aspects, the first mapper is a cache mapper and the data location is a metachunk. The method may include, when the corresponding data is stored in a metachunk of a cache virtual storage object, using a cache mapper and based on the offset of the corresponding data, determining whether the metachunk includes the appropriate first level subchunk for storing the corresponding data. The method may further include, when the first level subchunk has been included, obtaining the virtual element identification of the first level subchunk.

The method may further include obtaining a bitmap of the virtual element containing the first level subchunk. The method may also include, based on the bitmap, determining whether the first level subchunk contains a second level subchunk that includes the corresponding data.

The first mapper may be one of a regular mapper and a file based mapper and the data storage location includes a plurality of virtual storage objects. The method may include determining which of the regular mapper and the file based mapper has been designated the default mapper. The designation of the default mapper may be based on the size of the file that includes the corresponding data.

The method may further include, when the file size is below a threshold and the default mapper is the regular mapper, using the regular mapper and information maintained within an application file object, identifying an appropriate virtual storage object from the plurality of virtual storage objects, the appropriate virtual storage object containing the corresponding data. The method may further include, when the file size is above a threshold and the default mapper is the file based mapper, using the file based mapper and information maintained within a persistent file, identifying an appropriate virtual storage object from the plurality of virtual storage objects, the appropriate virtual storage object containing the corresponding data.

In another aspect, a computer system is provided that includes a processor and a memory containing instructions that when executed on the processor, cause the processor to perform operations. The operations include using a first mapper, determining for an input output operation whether a data storage location has been designated for storing a corresponding data in a virtual storage object, the input output operation involving the corresponding data. The operations further include, using the first mapper and at least one processor, acquiring the virtual element identification of the corresponding data. The operations further include, using the virtual element identification and the corresponding data, performing the input output operation.

BRIEF DESCRIPTION OF THE DRAWINGS

The present application can be best understood by reference to the following description taken in conjunction with the accompanying Figures, in which like parts may be referred to by like numerals.

FIG. 5 illustrates a table depicting various data object classes and corresponding allowed data types, according to some embodiments.

The Figures described above are a representative set, and are not an exhaustive with respect to embodying the invention.

DETAILED DESCRIPTION OF THE INVENTION

Although the present embodiments have been described with reference to specific example embodiments, it will be evident that various modifications and changes may be made to these embodiments without departing from the broader spirit and scope of particular example embodiments.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of structures, openings, protrusions surfaces, etc., to provide a thorough understanding of embodiments of the invention. One skilled in the relevant an will recognize, however, that the invention may be practiced without one or more of the specific details, or with other methods, components, materials, and so forth. In other instances, well-known structures, materials, or operations are not shown or described in detail to avoid obscuring aspects of the invention.

Reference throughout this specification to "Date IO" "Data access" or similar language would refer to both "data access" as well as "attribute access" of a file. Attribute can comprise of various properties of the file like size, modified time, access time, owner, permission and all other such related properties of a particular file.

I. Exemplary Environment and Architecture

Figure 1:
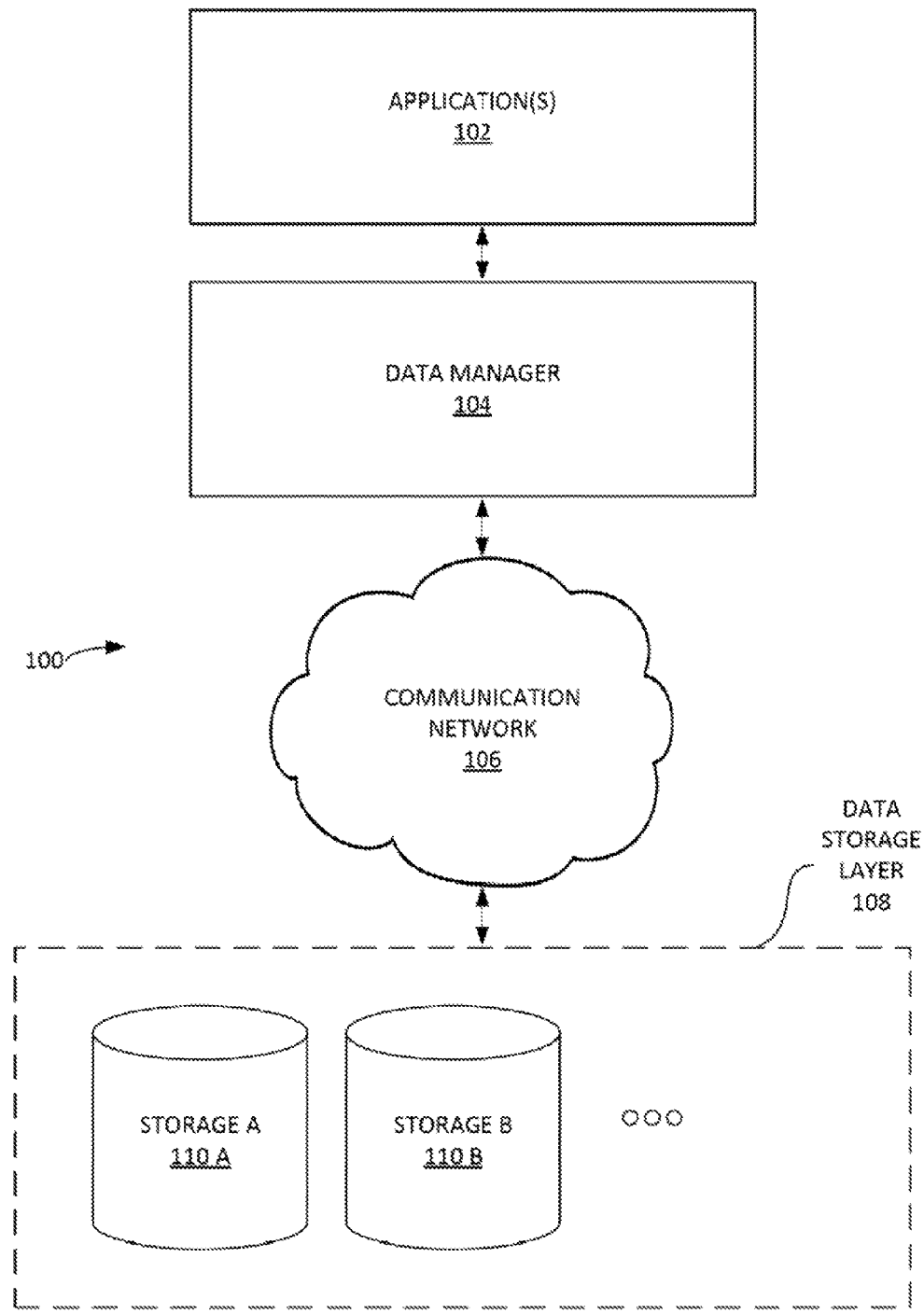
FIG. 1 illustrates an example data management system, according to some embodiments.

FIG. 1 illustrates an example data management system 100, according to some embodiments. In one embodiment, data manager 104 (e.g. a Datagres® middleware platform such as The systems and methods of the FIGS. 1-12) can include a middleware layer (e.g. a application-oriented middleware layer) that enables communication and management of data between an operating system at the application(s) 102 layer and various distributed data storage applications (e.g. such as data storage and/or filesystems) in the data store layer 108. As used herein, a 'layer' can refer to an abstraction layer of data management system 100. As used herein, a middleware layer can include functionalities and/or systems that are between the operating system applications (e.g. application(s) 102) and a data storage layer 108 on each side of a distributed computing system in a computer network. Data manager 104 can manage data from its origin until its deletion, taking it through the entire life cycle of growth, mobility, reliability, scalability and performance. Data manager 104 can be implemented to manage placement and/or dynamic distribution of data to satisfy any relevant service-level agreements (SLA), service-level objectives (SLO) (and the like) related to application(s) 102. Data manager 104 can provide access to a number of applications (e.g. storage 110A-B). Communication network 106 can include various computer network systems and protocols (e.g. the Internet, database communication networks, Ethernet, etc.).

Data manager 104 can include engineering design and implementation principles related to, inter alia, the following: asynchrony/loosely coupled properties for distributed and scalable development of the features of the architecture; multi-threading to support SMP environment; instrumentation and observation of the internals of the system for support, monitoring and debugging; high performance I/O, optimized algorithms for caching, Efficient resynchronization of the objects; portability across multiple operating system (OS) versions; self-described objects and the ability to assemble them together on-demand as and when they arrive; command-line utilities that form the basis of development and customer interactions; high availability (HA) features of hardening, disconnected operations, and clustered deployments; multi-tenant architectural properties of resource management, isolation, and security; ease of installation and upgrades; reliability of persistent data structures and meta data management; multi-level debugging ability with dynamic on/off of various levels both at user level and system level; verification of the deployed configurations, and integrity of the data; various Data Collection Policies via monitoring of the system from fine grained to coarse grained collection; intelligent analytics of the data collected at both fine and coarse grained level; related reporting for knowledge management, conclusions and feedback loop; ability to build scalable data center based abstractions of logical domains, storage spaces, grid analytics; integrated health management of the services; event notifications from kernel to help address the dynamic state changes in the system; in-built tools/primitives for building intelligent test framework and backdoor verifications; distribution abstractions of the objects for ease of use and management; and accounting to keep the block calculations of alloc/free, space policies, etc., consistent across multiple shared large no. of objects on heterogeneous elements.

It is noted that the systems and methods provided in FIG. 1 and subsequent figures disclose embodiments for implementation in a database system. However, additional implementations in various applications that utilizes data and data storage. Several additional use cases are now provided by way of example. The systems and methods of the Figures can be modified according to each use case. In one example, the systems and methods of the FIGS. 1-12 can be implemented in media and render farm applications (e.g. Maya 3D®, AutoDesk®, Blender®, etc.) for processing and rendering of animations, special effects, layer impositions on various movies and other similar videos. These applications can have Petabytes of data coming from Network File Systems. The 'hot' data can be cached on local drives, thereby drastically reducing their data access time. This can also leads to faster completion of the jobs. As used herein, 'hot' data can refer to frequently accessed data. Hot data typically can be set at a good cache-hit rate.

In another example, the systems and methods of the FIGS. 1-12 can be implemented in E-CAD applications (e.g. Autodesk®, Stylus®, etc.). For example, local caching of hot data can be implemented in applications such as chip designing, motherboard designing, and fabrication of chips and other related work.

In another example, the systems and methods of the FIGS. 1-12 can be implemented in database solutions (MySQL®, PostgrSQL® etc.). For example, database access can be accelerated by the data acceleration and caching system which leads to reduction in latency of access and increase in number of Transactions per Second (TPS).

In another example, the systems and methods of the FIGS. 1-12 can be implemented in file servers (e.g. server data to end users remotely). For example, the hot data can be cached by data management system 100 leading to faster access by users.

In another example, the systems and methods of the FIGS. 1-12 can be implemented in web servers (e.g. webserver like Apache, Tomcat etc.). For example, similar to file servers, but there the web content is cached by data management system 100 and served from cache devices resulting in faster loading of web page documents.

In another example, the systems and methods of the FIGS. 1-12 can be implemented in various proprietary applications. For example, any application designed and developed by any individual/organization, which accesses data from a local device and/or a NFS Share, can be accelerated by data management system 100 resulting in a great boost in application performance.

In another example, the systems and methods of the FIGS. 1-12 can be implemented in email servers (e.g. Zimbra, etc.). For example, data management system 100 can accelerate email servers by caching the hot data (e.g. comprises email and its metadata) thereby leading to a faster email access.

In another example, the systems and methods of the FIGS. 1-12 can be implemented in virtualization environments (e.g. Xen, KVM, etc.). The hot areas of the virtual machines (VM) can be cached by data management system 100 thereby resulting in faster VMs and/or allowing more VMs to be accommodated in the same physical server.

For example, an entire set of application data can be replicated and distributed partially or wholly synchronously or asynchronously across a bunch of heterogeneous filesystems or storage servers, both on LAN and/or WAN. The set of storage servers could be any of network or local filesystems or network or local block devices. These servers can reside in the LAN environment or WAN. Big data mining applications can use the platform provided herein to distribute, in a scalable manner, and access the data in a high performing, reliable way between distributed enterprises or service providers. Customers wanting to remove vendor lock in can replicate their data between boxes of two different vendors using the systems provided herein. An analytics feature of the systems provided herein can provide an efficient loop back mechanism from applications to the IT architecture fine tuning.

In general, data management system 100 can boost performance of an application that has its data coming from a local device (e.g. EXT3, EXT4, XFS) and/or an NFS network share.

Figure 2:
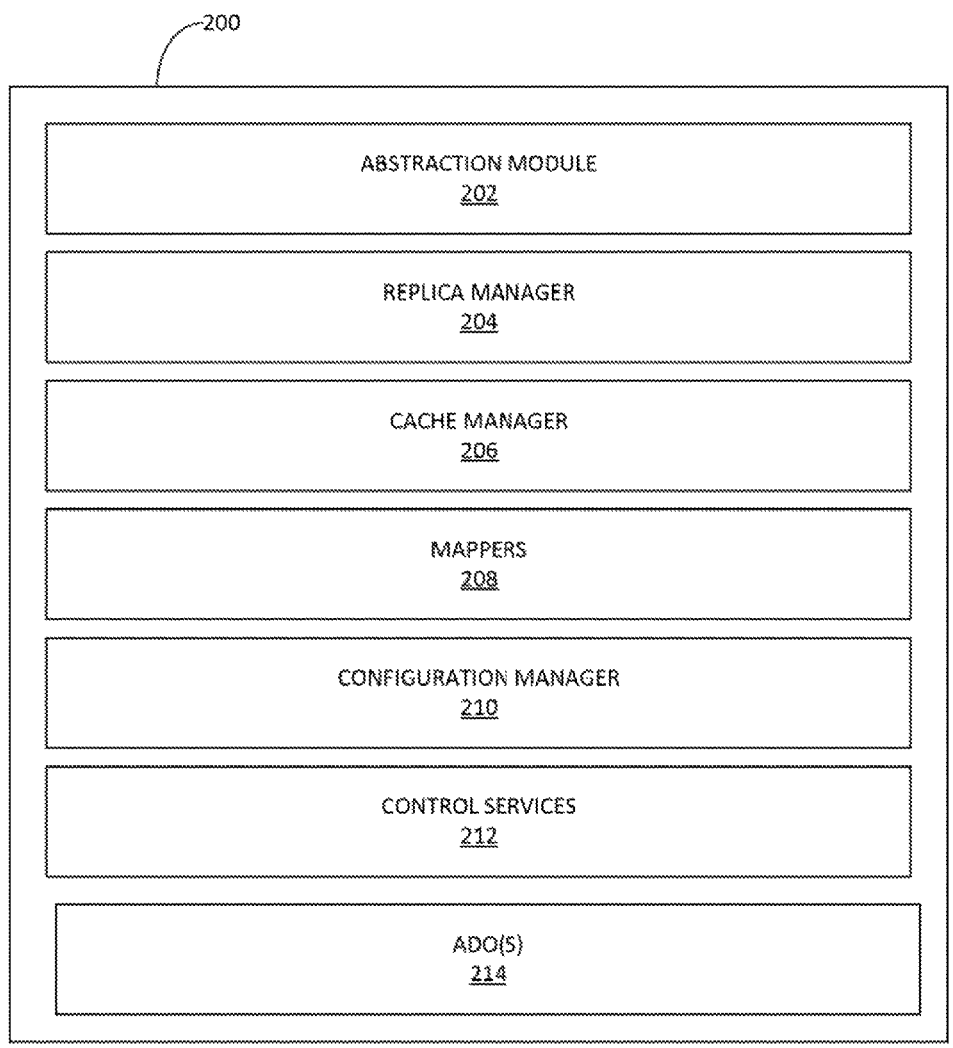
FIG. 2 depicts, in block diagram format, an example data manager according to some embodiments.

FIG. 2 depicts, in block diagram format, an example data manager 200 according to some embodiments. In some embodiments, data manager 200 can implement data manager 104 in FIG. 1. Data manager 200 can interface client-side applications (e.g. via one or more application program interfaces (APIs).

Data manager 200 can include abstraction module 202. Abstraction module 202 can abstract heterogeneous data elements (e.g. third extended file system (ext3), Network File system (NFS), etc.) into as storage objects (STO). A data element can be an atomic unit of data. Heterogeneous data elements can have different characteristics and formats such as data storage blocks, data files, network-attached storage (NAS) format, etc.). STOs can then be logically divided into these Virtual Storage Objects (VSTO). A VSTO can represent an instance of using a specific storage object for various purposes in the layers above it. A VSTO can have a defined interface that allows for extensible and/or scalable support for different data element types and/or protocols such as NAS, storage area network (SAN), iSCSI (Internet Small Computer System Interface protocol), Direct-attached storage (DAS), etc. A VSTO can also characterize the different properties of usage by the layers above it.

Replica manager 204 can utilize STO and VSTO objects for full and/or partial replication of data and other related operations. Replica manager 204 can view an underlying VSTO as a replica. Replica manager 204 can manage the synchronization of any distribution requests in order to satisfy the requests/requirements of the above layers. Cache manager 206 can provide a cached-version of a VSTO (e.g. a cache virtual storage object). For example, cache manager 206 can transparently stores VSTO data for various purposes, including the purpose that future requests for that data can be served faster. Mappers 208 can map various objects (e.g. STO and/or VSTO objects) between layers and also mapping the unique identifiers and/or handles of the objects to the lower layers of a data management system (such as data management system 100).

Configuration manager 210 can manage the integrity of the relationship of the objects. Configuration manager 210 can manage object creation. Configuration manager 210 can manage object deletion. Configuration manager 210 can manage dynamic transitions of object state. Configuration manager 210 can reside inside the client-device operating system's kernel. Control services 212 can be implemented in the client-device layer (e.g. user layers). Control services 212 can provide the primitives required for the data manager 200 management framework. Control servers 212 can be operatively connected with and, thus, interact with the configuration manager 210 of the client-device operating system's kernel. Control servers 212 can provide location independent interaction with the objects.

Application Data Object (ADOs) 214 can operatively connect with a client-side application and provide the file system interface for said applications. ADOs 214 can be implemented above the replication layer (e.g. as provide supra).

Data manager 200 can provide a user interface that enables a user to set various data manager 200 settings and/or parameters. Data manager 200 can further provided back-end management of the objects in co-ordination with the kernel layers.

Figure 3:
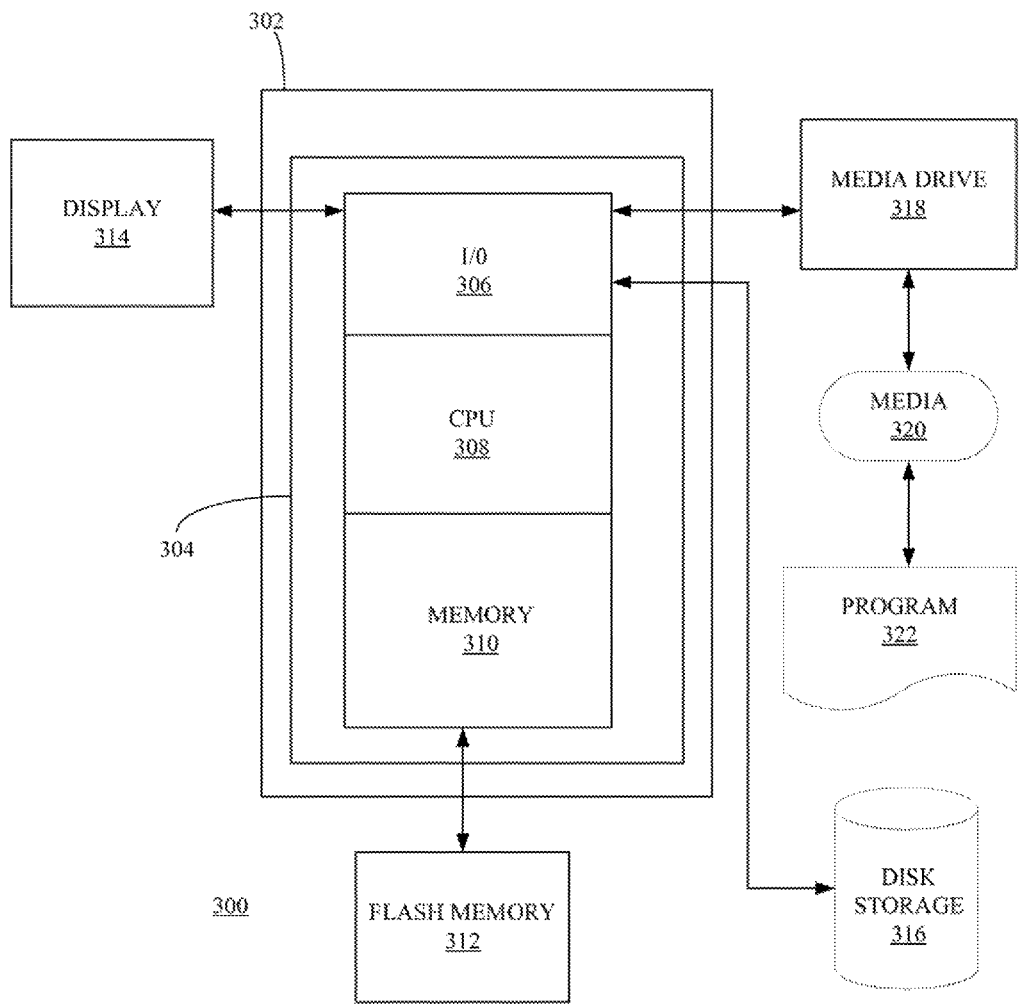
FIG. 3 is a block diagram of a sample computing environment that can be utilized to implement some embodiments.

FIG. 3 depicts an exemplary computing system 300 that can be configured to perform any one of the processes provided herein. In this context, computing system 300 may include, for example, a processor, memory, storage, and I/O devices (e.g. monitor, keyboard, disk drive, Internet connection, etc.). However, computing system 300 may include circuitry or other specialized hardware for carrying out some or all aspects of the processes. In some operational settings, computing system 300 may be configured as a system that includes one or more units, each of which is configured to carry out some aspects of the processes either in software, hardware, or some combination thereof.

FIG. 3 depicts computing system 300 with a number of components that may be used to perform any of the processes described herein. The main system 302 includes a motherboard 304 having an I/O section 306, one or more central processing units (CPU) 308, and a memory section 310, which may have a flash memory card 312 related to it. The I/O section 306 can be connected to a display 314, a keyboard and/or other user input (not shown), a disk storage unit 316, and a media drive unit 318. The media drive unit 318 can read/write a computer-readable medium 320, which can include programs 322 and/or data. Computing system 300 can include a web browser. Moreover, it is noted that computing system 300 can be configured as a middleware server.

Figure 4:
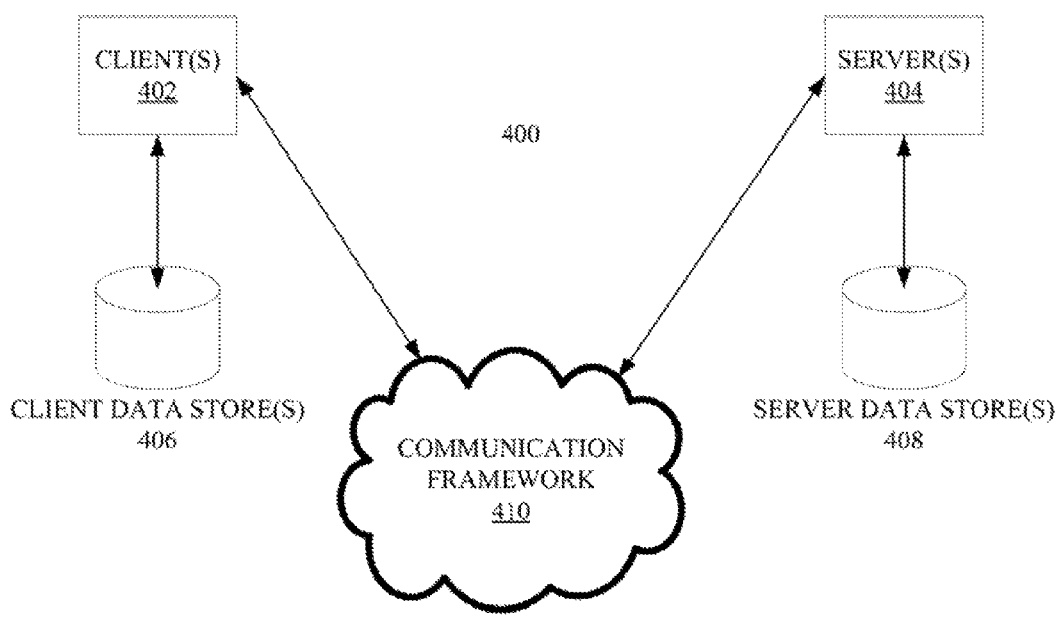
FIG. 4 is a block diagram of a sample computing environment that can be utilized to implement some embodiments.

FIG. 4 is a block diagram of a sample computing environment 400 that can be utilized to implement some embodiments. The system 400 further illustrates a system that includes one or more client(s) 402. The client(s) 402 can be hardware and/or software (e.g., threads, processes, computing devices). The system 400 also includes one or more server(s) 404. The server(s) 404 can also be hardware and/or software (e.g., threads, processes, computing devices). One possible communication between a client 402 and a server 404 can be in the form of a data packet adapted to be transmitted between two or more computer processes. The system 400 includes a communication framework 410 that can be employed to facilitate communications between the client(s) 402 and the server(s) 404. The client(s) 402 are connected to one or more client data store(s) 406 that can be employed to store information local to the client(s) 402. Similarly, the server(s) 404 are connected to one or more server data store(s) 408 that can be employed to store information local to the server(s) 404.

In some embodiments, system 400 can be include and/or be utilized by the various systems and/or methods described herein to implement process 100. User login verification can be performed by server 404. Client 402 can be in an application (such as a web browser, augmented reality application, text messaging application, email application, instant messaging application, etc.) operating on a computer such as a personal computer, laptop computer, mobile device (e.g. a smart phone) and/or a tablet computer. In some embodiments, computing environment 400 can be implemented with the server(s) 404 and/or data store(s) 408 implemented in a cloud computing environment.

II. Exemplary Processes and Use Cases

FIG. 5 illustrates a table 500 depicting various data object classes and corresponding allowed data types, according to some embodiments. The general object classes can include, inter alia, STOs, VSTOs, Replica VSTOs, and ADOs. Replica VSTO's can be implemented as a layered VSTO on top of other VSTOs. Replica VSTO's can route requests to an appropriate VSTO. The implementation of these data objects vary depending on the type of the objects and other parameters.

Figure 6:
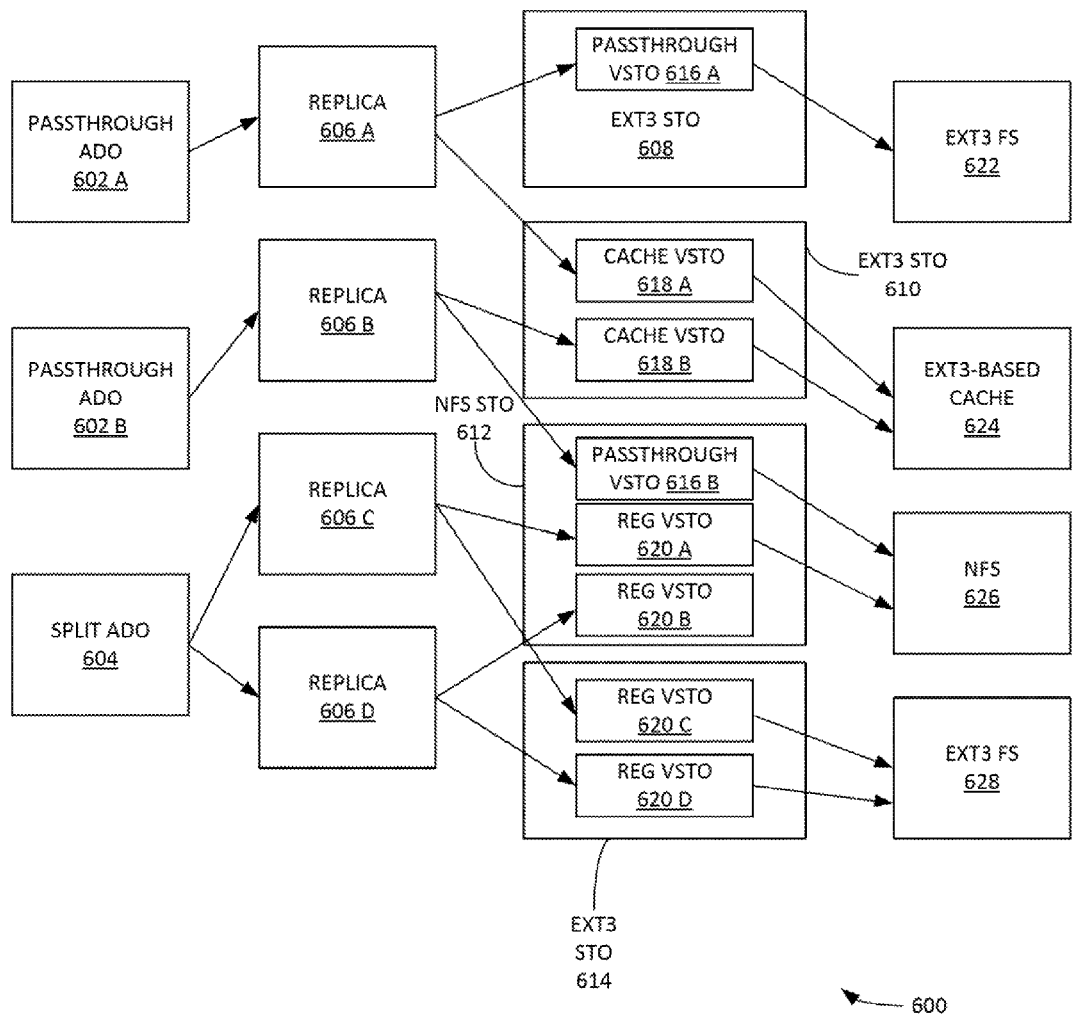
FIG. 6 illustrates an example middleware data management system, according to some embodiments.

FIG. 6 illustrates an example middleware data management system 600, according to some embodiments. Middleware data management system 600 includes ADOs 602A-B and 604. ADO's 602A-B can include passthrough ADO's, one on ext3 (e.g. EXT3-BASED CACHE 624) and one on NFS (NFS1026), both using the same cache. ADO 604 (e.g. a split ADO) can be a two-way replica split ADO. ADO 604 can have files across NFS (e.g. NFS1026) and EXT3-FS (e.g. EXT3 FS 628). FIG. 6 illustrates various other mappings of ADOs 602A-B and 604 to VSTOs (e.g. passthrough (PT) VSTO 616A-B, CACHE VSTO 618A-B, regular (REG) VSTO 620A-D) to STOs (e.g. EXT3 STO 608, EXT3 STO 610, EXT3 STO 614, NFS STO 612) and the backend file systems (e.g. EXT3 FS 622, EXT3-BASED CACHE 624, NFS 626, EXT3 FS 628). Passthrough data objects can be data objects that reflect the underlying base file system or device's properties. VSTO passthrough functionalities can support directory operations pushed directly to the base file system (FS). ADO and VSTO passthrough functionalities can include intelligence of the overall structure of the data objects to ensure the correctness of the implementation. VSTO cache objects can maintain extra metadata related to mappings of the objects, and other, it is an enhancement of the VSTO regular object implementation. VSTO regular implementation can provide the basic interfaces for VSTO and the virtual data element name spaces. ADO 604 can be implemented on top of a regular VSTO. The ADO 604 can include intelligence of placement of data anywhere in the heterogeneous environment. One can imagine an ADO where it uses one passthrough VSTO, few regular STO, few cache VSTOs. A metaconcat ADO can be an ADO that concatenates multiple passthrough VSTOs to form a concatenated name space for a single ADO. A passthrough auto-cached ADO implemented on top of an autofs STO, creates a passthrough cached ADO for each mount point arrival in the underlying autofs STO. An autofs can be a package that provides support for auto mounting removable media and/or network shares when they are inserted and/or accessed.

Data objects can be implemented with various interface (e.g. integrate into existing file system interfaces as defined by operating systems, proprietary interfaces, etc.). A VSTO (e.g. replica VSTO) can implement an interface defined by the middleware system. The protocol of I/O requests spawned by data objects can follow a set of principles defined by the middleware system as well. A management interface defined by these data objects can enable control of creation, deletion, attachment of data objects, detachment of data objects, etc. according to the object type and the relationship between the objects. These functionalities can be implemented by user-level control services that can invoke input/output control functionalities on the kernel objects.

ADO objects can manage a set of file objects (e.g. an application file object (AFO), directories, special files, regular files with data being stored on the VSTOs in a persistent way, etc.). The distribution of the AFO to the VSTOs can depend on the type of the relevant ADO and/or policies set on the AFO and ADO. AFOs can be modes in Linux environment.

A VSTO interface can be implemented by a replica data object and/or various types of VSTO. Use of an STO can be implemented with a handle to the VSTOs created in STO. VSTOs can manage a set of virtual data element objects (VEs). A collection of VE's can belong to a name space. A replica VSTO may not have its own VE name space, but may comprise of multiple VSTOs.

The storage data object (STO) can be an umbrella object that serves multiple VSTOs. VSTO(s) in the STO can have different semantics in alignment with the underlying data element. Each of the VSTOs can have multiple VE namespaces. A VE can be the basic object of operation inside a VSTO. An STO can have a one to one mapping to an underlying data element. Occasionally, multiple storage objects per data element can be extant as well. In this case, each STO can be allocated a particular region of the data element. If the underlying data element is a file system and/or an NFS store, then individual directories can become an STO by itself. Thus there can be multiple independent, non-overlapping STOs corresponding to one data element. STOs can operate on a data element using standard interfaces. An STO can include information on the internals of the data element to exploit some specific optimization capabilities for performance.

An STO can be taken offline or online manually for administrative purposes or a dynamic error on I/O or any other operation on STO can result in the STO being taken offline. When an STO is taken offline, all the VSTOs inside that STO is also taken offline and that results in appropriate notifications to the higher layers so that they can handle these events gracefully. There are provisions to taken individual VSTO offline as well from an administrative point of view if required. The STOs persistent configuration information is stored inside the storage object header. The description of the STO header is given in the above section related to the object persistent control blocks. The STO can be available on top of data elements that are of type 'file systems' (e.g. ext3, XFS, NFS, (v3, v4)), on top of raw devices. VSTOs semantics/definitions of the mappings of the VSTO to the internals of data elements can be based on the STO implementation and the VSTO type. For example, in the case of STO on top of a raw device, there can be a VSTO that takes owner ship of that device's I/O related aspects. Whereas in case of a file system there can be multiple VSTOs each of which takes ownership of different directories in the file system and VSTOs should not have any overlap. The STO can provide the following properties when it comes to managing the VSTOs include, inter alia: definitive isolation between the VSTOs so that they can be independently carved out, deleted, without affecting the other VSTOs; provide a VSTO implementation dependent dependencies or interactions, if any, between the VSTOs; space management in terms of size, name space and other; and/or semantics of interaction with the underlying data element.

The storage object (STO) can share the data element with other storage objects or outside entities as well. Thus, either the STO can own the data element exclusively or in a shared manner with other stuff. Appropriate implementation logic to avoid data corruption and security issues should exist in those scenarios.

Virtual data elements can be the basic objects used to store and/or retrieve data in the VSTOs. Each of the virtual data objects can be mapped to an underlying data element in an implementation specific manner. VEs have a size, and many such VEs can be related in an implementation specific manner. For example, a cache VSTO can relate VEs belonging to one cached file at the ADO level. VEs can be uniquely identified by VE identifiers and/or VE handles. VE handles can be unique inside of each VSTO. VEs can include several attributes related to its data, size, mapping. These attributes can be persisted or not persisted depending on the implementation. A VE namespace can be a collection of VEs that manages the allocation of VE identifiers, deletion, and management. VE namespace belong to a VSTO and can be shared between multiple VSTOs. VE identifier allocation can be based on the implementation as well. A VE identifier can directly map to the identifiers in the underlying data elements and/or can be allocated explicitly and then mapped to the underlying data element object identifiers. The namespace management can be based on the type of VSTO, or the type can be attributed to the namespace itself. For example, in a passthrough namespace management, VEID and/or VE handles can be one to one mapped to the underlying data element objects. The mappers can be used for mapping identifiers from one name space to another name space. Mappers can be persistent if required for fast lookups etc. VE identifiers can be mapped from VE namespace to the underlying data element objects. For example, VE identifiers can be mapped to the files inside data elements and/or any other objects inside data elements.

VSTO can be units of STO's. VSTO can be contained in a STOs. VSTOs can be replicated by layers above (e.g. replica VSTOs). VSTOs can own the VE namespaces. VSTOs can be responsible for managing the life cycle of the VE objects inside the namespace and the VE namespaces belonging to it. VEs can be instantiated on demand based on the operations performed on the VSTO and subsequent operations on the VEs require a VE handle to be passed. VSTO chooses the mapping methodology of the VE namespace to the underlying data element object name space. VSTO can select an appropriate type of mapper to manage the mappings. A VSTO can have a specified size (e.g. defined by blocks). A VSTO can manage the accounting of the blocks used in relation to the STOs and other VSTOs. VSTOs can be instantiated at the time STOs come online. A VSTO can be added into a STOs mounted list of VSTOs. VSTO can be plumbed into the higher layers (e.g. ADO objects) via VSTO object handles. The VSTO object handles can maintain a plumbing specific state and dynamic information. A VSTO can be plumbed into multiple objects at the higher layers depending on the implementation of VSTO. A distributed VSTO can be plumbed locally via a 'vstobj' handle and can be plumbed remotely via the remote 'vstobj' handle as well. Remote VSTOs implement the interface to interact with the VSTOs on a different node, to operate on the VEs and other objects inside the VSTO. A remote VSTO can use any transport, flexibly NFS, or infiniband-based MPI, or any other. Distributed VSTO objects can allow access of a VSTO from different nodes yet maintain consistency semantics specific to the type of VSTO. A consistency layer at the level of VSTO can enable the higher layers to implement scalable distributed data routing layers.

As described in the table of FIG. 5, different types of VSTOs depending on the name space management, mapping, and other. VSTO types can be regular, passthrough, metapass, and cache types. Regular VSTOs can have one VE namespace, and the VE identifiers can be mapped dynamically to the underlying data element's objects. VE object attributes can store the underlying object identifiers persistently. Regular VSTO can provide the semantics of flat VE objects which contains data. Regular VSTO provides operations for allocation/deallocation of VE identifiers by the top layers, read/write operations on the VE identifiers. Regular VSTOs may not support directory related operations. Regular VSTOs function on top of data elements but map the VE identifiers to the flat objects underneath. In case of passthrough VSTO there is no persistent VE namespace. Instead the VE objects can be in-memory and mapped one to one with the underlying data element objects. VE identifiers can be exactly same as that of the underlying data element objects' identifiers. Passthrough VSTOs support directory operations that can be passthrough operations. Passthrough VSTO passes the operations to the underlying objects (e.g. when VE identifiers are one-to-one) without any remapping operations. Metapass VSTO is similar to passthrough VSTO, except that there is an explicit mapping of VE identifiers to the underlying data element objects. VEID mappings can be maintained such that the data element object identifiers can be persistent. The use of metapass VSTO comes in where the higher level replication layers want to see a uniform name space for VE identifiers across multiple VSTOs even though the underlying data element object identifiers could change. Cache VSTO implements the caching semantics. Cache VSTO has multiple name spaces—chunk name space, and meta-name spaces. Cache VSTO supports eviction of VEs when running out of space, and has sophisticated algorithms to manage the cache space and accounting. Cache VSTO supports various semantics of 'writeback', 'writethrough', and/or 'writealways' types and cache objects from a corresponding source VSTO. In a typical case source VSTO is a passthrough VSTO and the replica VSTO does the routing of the data between the source and the cache VSTOs. Cache VSTOs uses cache mappers to maintain the mapping of the source objects to cache objects. These mappings can be persistent.

Replica VSTO can be a kind of VSTO used to manage routing/replication policies between multiple and any VSTOs below it. The relationships can be captured in the diagram shown in FIG. 6 (with elements to the left being 'above' elements to the right of the figure). Replica manager manages the replica VSTOs. The middleware system can support n-way replica in a generic way. A replica can be a copy of the VSTO. In some embodiments, replicas can be VSTOs. A replica data object can be partial or full replica data object. A partial replica data object may not contain the data necessary for access by higher level objects. A full replica data object can contain the data necessary for access by the higher level objects. Replica VSTOs can implement error recovery algorithms, synchronization algorithms between the inconsistent VSTOs, all of which can be accomplished while the VSTOs are online.

Application data objects (ADOs) map files and/or directories to the underlying VSTOs. ADO's can integrate into the general file system interface of an operating system. ADOs can provide a meta-file system architecture 'on top' of VSTOs which are, in turn, 'on top' of existing data elements. Data elements can be file systems (NFS, ext3, and iSCSI, SAN, etc.). The ADO layer can acts as a "Data Router" to route the data to different VSTOs. The ADO layer can provide the infrastructure of dynamically managing data placement and scaling based on applications' SLA/SLO requirements. The ADO layer can utilize mappers (e.g. regular mappers, passthrough mappers and/or 'fb mappers') to map ADO level objects to lower level objects. Different types of ADOs can include, inter alia: passthrough ADO (E.g. an ADO in conjunction with the replica layer routes the data to data elements and the cache devices for increased performance; a metapass ADO (e.g. an ADO in conjunction with replica layer routes the data for replication, or caching); Split/Scalable ADO (e.g. an ADO that scales across multiple data elements by splitting files, replicating across the VSTOs that are on top of the data elements); a distributed ADOs (e.g. a distributed ADOs that can provide the abstraction of a single ADO across multiple nodes and it can be of type passthrough, split/scalable); and/or concatenation ADOs (e.g. an ADO that allow concatenation of a set of VSTOs passthrough mode).

III. Mapping Overview

In various embodiments, mappers may be objects that support persistent mapping of one namespace identification to another namespace identification, which is sometimes described as the concept of resolution. A namespace might apply to a particular Virtual Storage Object (VSTO) or to a set of VSTO's. Mappers may include the logic for and perform transformation, maintenance, and persistence. New mappers can be added dynamically without changing the fundamentals of existing code around Application Data Objects (ADO) and other objects. Various types of mappers may include: regular mappers, file based mappers, pass through mappers, and cache mappers.

Mappers may identify relationships between an object (e.g., a data object) and one or more VSTOs. Mappers may directly map identifications, and some mappers may map one identification to multiple identifications based on regions of data. Some mappers are persistent, and others are not.

Within a middleware architecture, the primary interface for mappers may include: readmap, writemap, resolve, deletemap, etc.

IV. Types of Mappers

A. Regular Mappers

Regular mappers map ADO level objects to one or more Virtual Element (VE) objects inside one or more VSTOs. Regular mappers may typically be used for split ADOs, which may be mapped to multiple VSTOs in an infinitely scalable manner.

The VSTOs can correspond to different data elements having various characteristics in terms of performance, reliability, and efficiency. At the ADO level, Application File Objects (AFO) can maintain persistent information corresponding to which offset maps to which Virtual Element Identification (VEID). Regular mappers contain an algorithm based on policies defined for the AFOs at the directory level or file level. Typically, the next level of VSTOs are replica VSTOs from the ADO layer.

Allocation oft new mapping to AFO involves: a) selection of the appropriate VSTO; b) allocating the VEID from that VSTO. The policy corresponding to the file is maintained in the AFO. Examples of various policies may include: place in faster storage, or place in more reliable storage with defined reliability. Examples of defined reliability may be n-way replication, parity based protection, disaster recovery protection, etc. The VSTO object may inherit the reliability/performance characteristic from the data element object, which can thus make the reliability/performance characteristic available at the mapper layer. These properties may be defined at the time a Storage Object (STO) is created, or they may be auto-learned during operation of the system.

Algorithms may help stripe files for parity protection based on space availability and the LOAD on one or more VSTOs. For example, all *.o files could be placed on a memory based VSTO, while *.jpg files could be placed on low cost IDE based VSTOs. Mapping information for regular mappers may be co-located within the AFO object itself.

B. File Based Mappers

File based mappers (FB Mappers) work for AFOs that might work less well with regular mappers, such as files that are up to a petabyte or larger, with VEs that are potentially one Gigabyte or larger (one Gigabyte being an example limit here, it can be any configurable limit)

The mapping for a file based mapper may be persistently stored on a particular VSTO, which can use faster storage to help accelerate access to a large file and may operate separately from an AFO. File based mappers may operate differently than regular mappers with respect to allocation algorithms and choices of VSTOs.

C. Passthrough Mappers

Passthrough mappers may be 1-1, and may have limited amounts of logic in terms of placement. Passthrough mappers may provide flexibility for accommodating VSTOs that correspond to data elements that are used in a passthrough mode.

D. Cache Mappers

Cache mappers dynamically map source VEIDs to VEIDs of cache VSTOs for faster access. The source VEIDs can be added or removed from cache VSTOs at any time. Multiple race conditions may be handled by a cache mapper algorithm. Synchronization with VEID accesses from source and cache and top level ADO mappings to them may be complex.

The cache mapper may be accomplished using a persistent file that reverse maps the source VEIDs to cache VEIDs, and that assigns the source VEIDs as owners for the cache VEIDs. The synchronizing happens on the source object's lock. The lock on the cache object is obtained once the cache object is looked up.

A readmap method of applying the cache mapper may perform negative lookups efficiently and may also plumbs the cache handle to the top layer ADO as an optimization to avoid accessing or viewing the persistent information each time.

A cache mapper may implement (e.g., create and use) chunks of data to help map source VEIDs to cache VSTOs. Each chunk has a VEID that corresponds to a source side VEID, which can be called as the owner of the chunk VEID. The first chunk representing the source side VEID is called a metachunk, and it contains both data as well as meta information that corresponds to all the chunks of the source VE object. Each chunk can be of varying sizes, depending on the amount of data cached. The maximum chunk size is configurable, at a VSTO level, and the size applies on all the VE objects in the VSTO.

The chunk VE objects may be allocated in the mapper on-demand. In this way, a source VE object can be sparsely mapped to multiple cache VE objects. The cache mapper also maintains the bitmaps of which blocks of the source VE objects have been cached in the cache VE object. All logs associated with cache VE objects are maintained by the cache mapper, and crash/recovery management may be performed using cache consistency algorithms.

V. Exemplary Operations

A. Passthrough Mappers and Cache Mappers

A passthrough ADO may sit directly on top of the existing data directories or mounted filesystems. When combined with a cache device, it can increase application performance.

Figure 7:
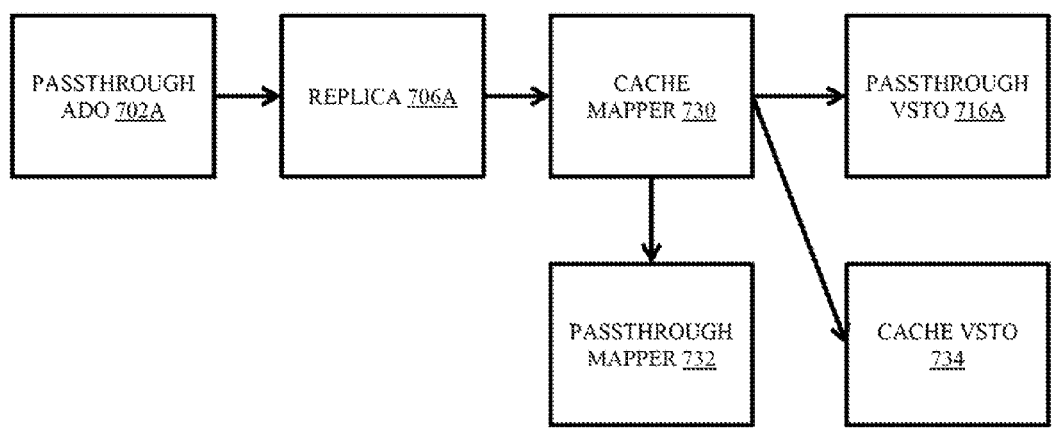
FIG. 7 is a schematic diagram of a mapping system that includes a cache mapper and a passthrough mapper, according to an embodiment.

In FIG. 7, an exemplary system includes a passthrough ADO 702A, a replica 706A, a cache mapper 730, a passthrough mapper 732, a passthrough VSTO 716A, and a cache VSTO 734. The passthrough VSTO 716A is from a source device storage object. The cache VSTO 734 is from a cache device storage object. Data is cached after a first read, and data is fetched from the cache from second and subsequent reads. Performance can thus be increased.

In an example, a read I/O operation may be performed on a 100 MB file. Assume the I/O size is 64 KB and the offset from where the read should happen is 10 MB. In this example, each first level subchunk is 2 MB, although they may be of varying sizes in other embodiments. Given a 10 MB offset, the first level subchunk for the I/O is the 6th first level subchunk.

The I/O starts from the application layer, traverses down to the replica layer, and from there to one of the passthrough VSTO 716A and the cache VSTO 734. Given that one of the VSTOs is associated with the source device and the other VSTO is associated with the cache device, the system needs to determine whether the cache VSTO contains the information.

Four possible scenarios are considered: 1) this is the first time a read I/O is occurring for the given file; 2) some I/O has already happened on the given file, and the metachunk has been created, but the appropriate first level subchunk has not been created; 3) the first level subchunk (e.g., the appropriate 2 MB subchunk) is in cache, but the requested second level subchunk is not in cache (e.g., the requested 64 KB of blocks are not cached); 4) the first level subchunk and the desired second level subchunk are in cache.

1) This is the first time a read I/O is occurring for the given file. The system learns that the metachunk has not been created. The passthrough mapper 732 is used to store the inode number of the main file and to associate it with the metachunk's VEID. First and second level subchunks are not necessarily created.

2) Some I/O has already happened on the given file, and the metachunk has been created, but the appropriate first level subchunk has not been created. The cache mapper 730 gets the metachunk and finds out if the 6th first level subchunk has been created. Because it has not been created, the system retrieves the data, from the passthrough VSTO 716A and creates the first level subchunk.

3) The first level subchunk (e.g., the appropriate 2 MB subchunk) is in cache, but the requested second level subchunk is not in cache (e.g., the requested 64 KB of blocks are not cached). The cache mapper 730 gets the metachunk and finds out if the 6th first level subchunk has been created. The cache mapper then refers to the VEID of the first level subchunk and obtains the block bitmap for the first level subchunk. The block bitmap may include 512 bits, each corresponding to a 4 KB page.

The cache mapper 730 then checks the block bitmap to determine whether the requested second level subchunk is within the first level subchunk. Because it has not been created, the system retrieves the data from the passthrough VSTO 716A and creates the second level subchunk. The cache mapper 730 may then update the block bitmap of the corresponding first level subchunk (e.g., the 6th first level subchunk), for future I/Os to be served from the cache.

4) The first level subchunk and the desired second level subchunk are in cache. The cache mapper 730 gets the metachunk, and finds out that the first and second level subchunks are present. The system can then retrieve the information from the cache VSTO 734.

B. Regular Mappers and File Based Mappers

Figure 8:
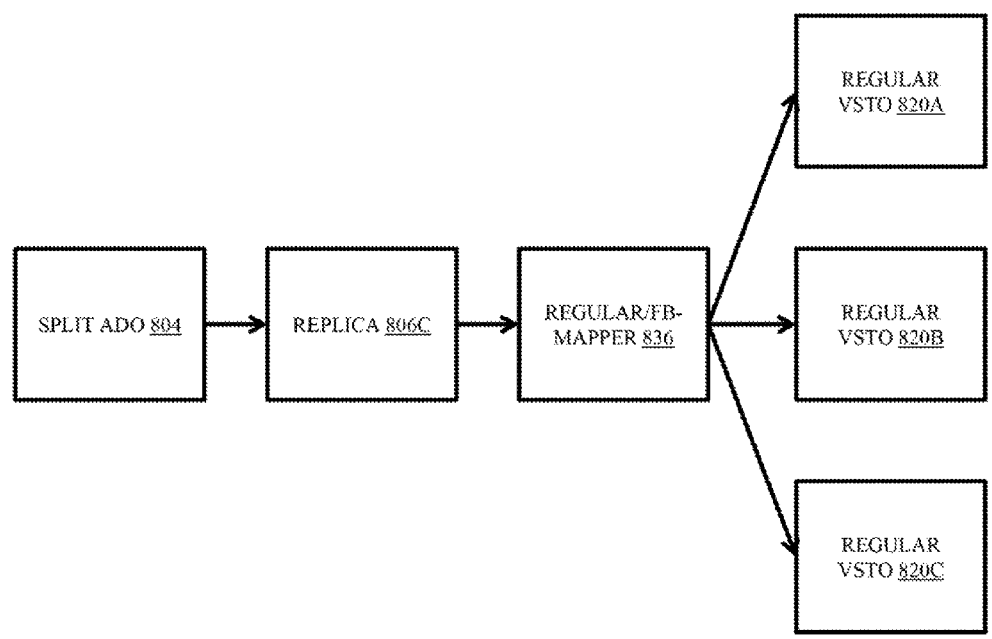
FIG. 8 is a schematic diagram of a mapping system that includes a regular or file based mapper, according to an embodiment.

FIG. 8 includes a split ADO 804, a replica 806C, a regular/FB mapper 836, a regular VSTO 820A, a regular VSTO 820B, and a regular VSTO 820C.

A split ADO 804 may be used with multiple VSTOs (e.g., regular VSTOs 820A, 820B, 820C, etc.) associated with multiple devices (e.g., STOs) that may be local and/or remote. The split ADO 804 may combine the capacity available from all the VSTOs and present a single namespace for the user to use. When files are stored in the split ADO 804, they are actually being split across different VSTOs having different devices.

In an example, if a 1 GB file is copied to a split ADO 804 that is formed from four VSTOs, then the 1 GB file may be split into 64 MB chunks. For a 1 GB file, this may mean that 16 chunks are used to make up the 1 GB file, and each chunk may be stored in one of the four VSTOs in round robin fashion. In other words, the first VSTO will have chunks 1, 5, 9, and 13, and the second VSTO will have chunks 2, 6, 10, and 14, and so forth.

In some embodiments, the split ADO 804 may also contain an equal number of cache VSTOs where the user warns capacity as well as performance.

The difference between when the regular/FB mapper 836 acts as a regular mapper or the file based mapper involves the way they operate and the conditions when each is invoked In some other embodiments, a separate regular mapper and a separate file based mapper are used.

When a file is first created, the regular mapper is assigned as the default mapper. If the file grows beyond a size limit (e.g., 512 MB, which may be a configurable value), then the default mapper (e.g., the regular/FB mapper 836) for the file may be dynamically and automatically changed from the regular mapper to the file based mapper. In some embodiments, the default mapper may be changed back to the regular mapper from the file based mapper for files that shrink below the threshold.

The information for the regular mapper may be inside the application file object itself. In contrast, the file based mapper may use a special persistent file for each inode to maintain information.

C. Exemplary Process Flowcharts

FIGS. 9, 10, 11, and 12 are flowcharts of mapping methods, according to various embodiments.

Figure 9:
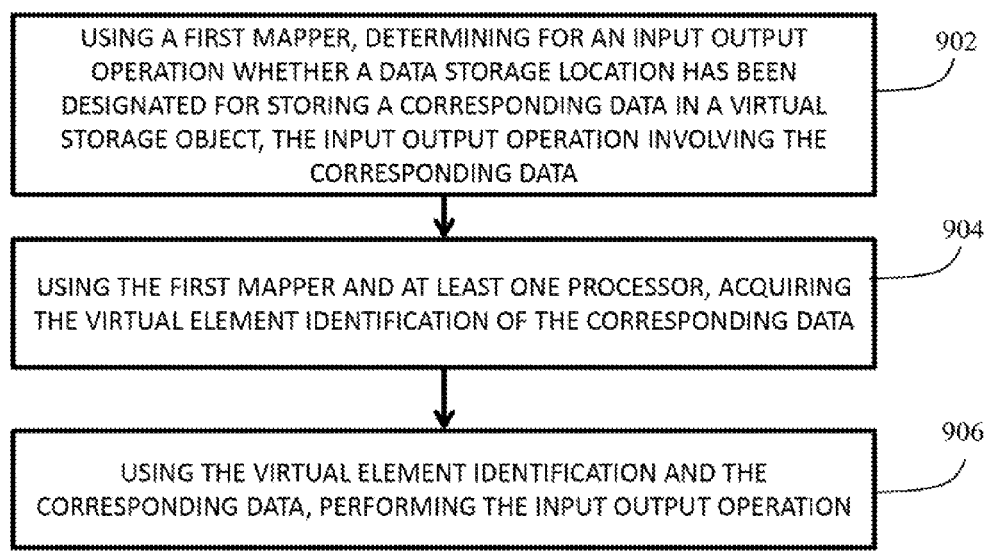
FIGS. 9, 10, 11, and 12 are flowcharts of mapping methods, according to various embodiments.

In operation 902 of FIG. 9, using a first mapper, the system determines for an input output operation whether a data storage location has been designated for storing a corresponding data in a virtual storage object, the input output operation involving the corresponding data.

In operation 904, using the first mapper and at least one processor, the system acquires the virtual element identification of the corresponding data.

In operation 906, using the virtual element identification and the corresponding data, the system performs the input output operation.

Figure 10:
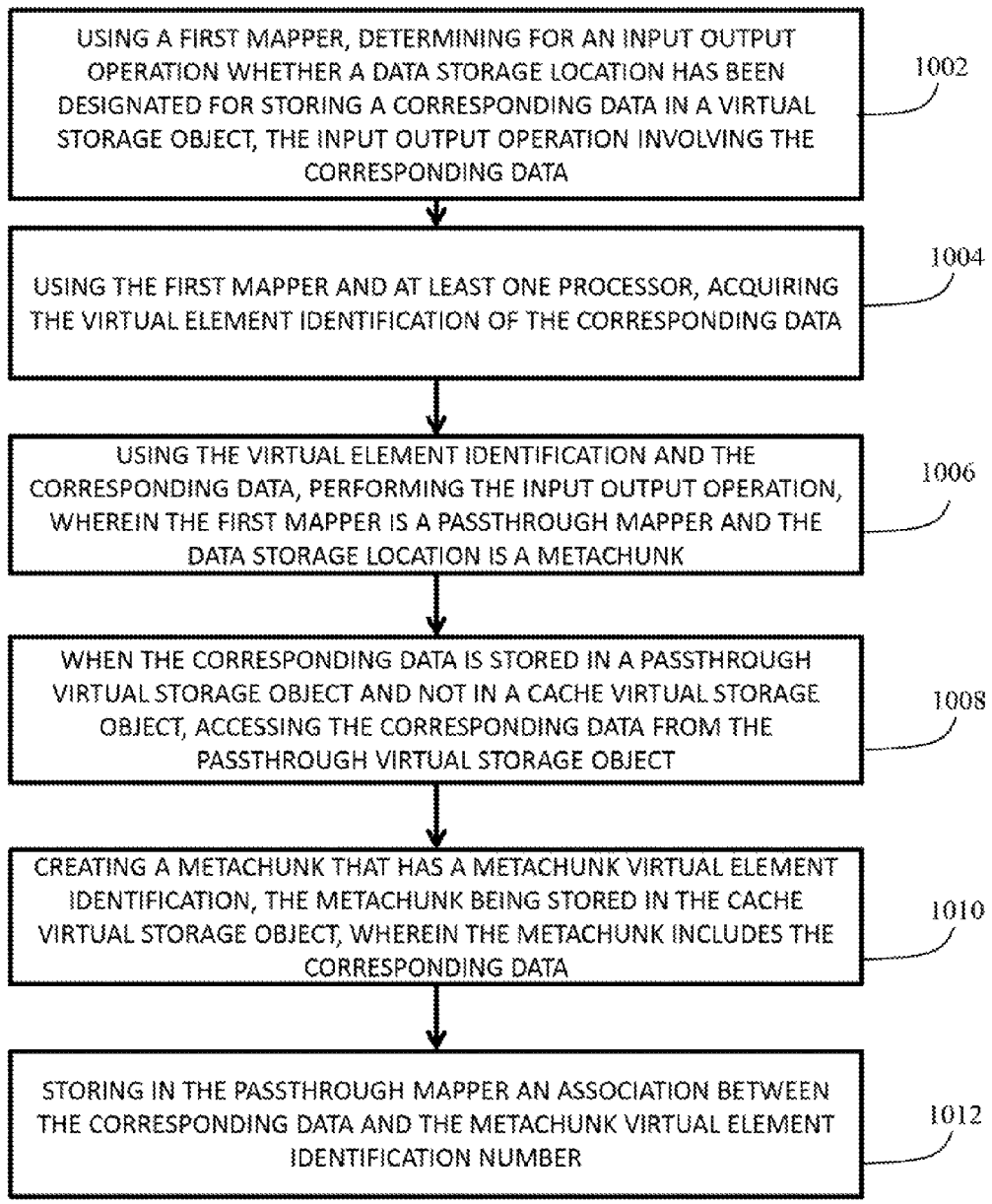

In operation 1002 of FIG. 10, using a first mapper, the system determines for an input output operation whether a data storage location has been designated for storing a corresponding data in a virtual storage object, the input output operation involving the corresponding data.

In operation 1004, using the first mapper and at least one processor, the system acquires the virtual element identification of the corresponding data.

In operation 1006, using the virtual element identification and the corresponding data, the system performs the input output operation, wherein the first mapper is a passthrough mapper and the data storage location is a metachunk.

In operation 1008, when the corresponding data is stored in a passthrough virtual storage object and not in a cache virtual storage object, the system accesses the corresponding data from the passthrough virtual storage object.

In operation 1010, the system creates a metachunk that has a metachunk virtual element identification, the metachunk being stored in the cache virtual storage object, wherein the metachunk includes the corresponding data.

In operation 1012, the system stores in the passthrough mapper, an association between the corresponding data and the metachunk virtual element identification number.

Figure 11:
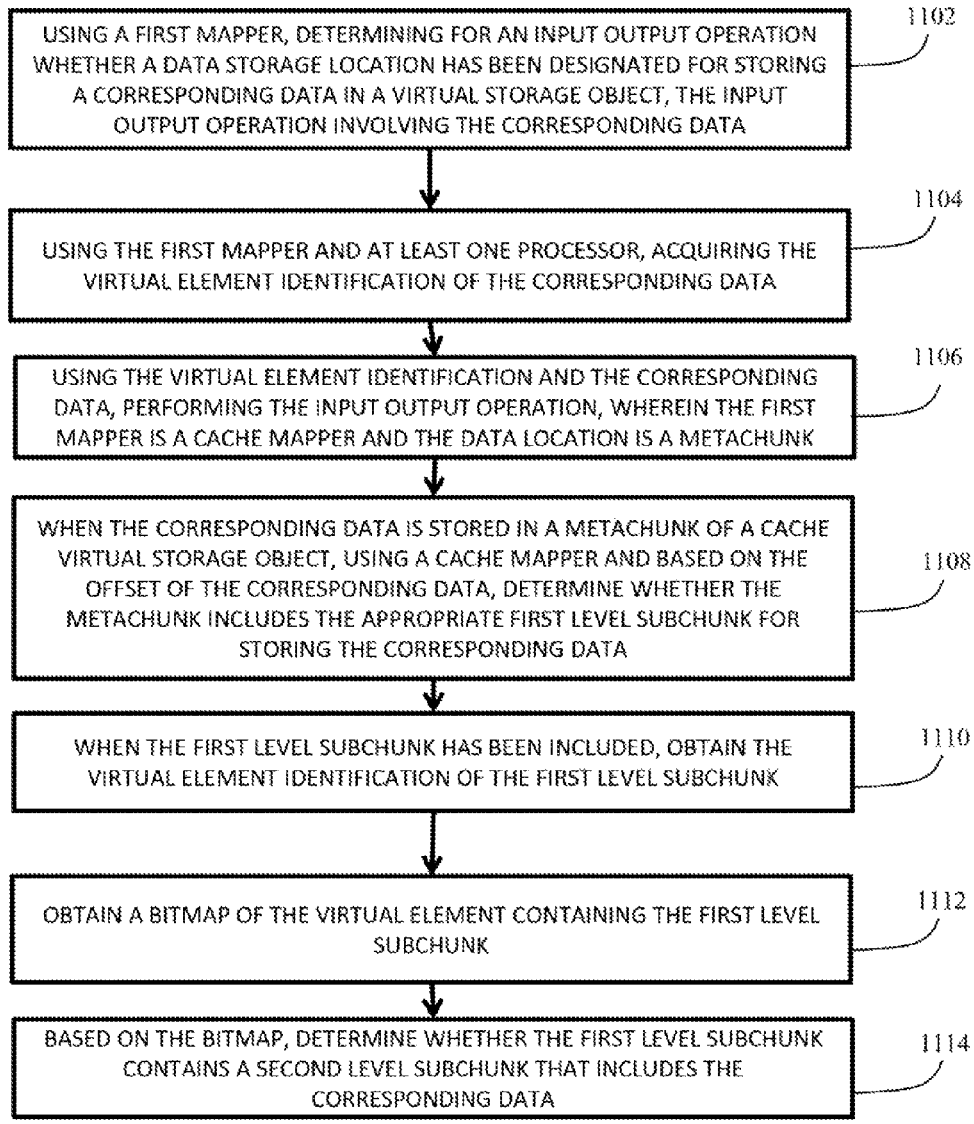

In operation 1102 of FIG. 11, using a first mapper, the system determines for an input output operation whether a data storage location has been designated for storing a corresponding data in a virtual storage object, the input output operation involving the corresponding data.

In operation 1104, using the first mapper and at least one processor, the system acquires the virtual element identification of the corresponding data.

In operation 1106, using the virtual element identification and the corresponding data, the system performs the input output operation, wherein the first mapper is a cache mapper and the data location is a metachunk.

In operation 1108, when the corresponding data is stored in a metachunk of a cache virtual storage object, using a cache mapper and based on the offset of the corresponding data, the system determines whether the metachunk includes the appropriate first level subchunk for storing the corresponding data.

In operation 1110, when the first level subchunk has been included, obtain the virtual element identification of the first level subchunk.

In operation 1112, obtain a bitmap of the virtual element containing the first level subchunk.

In operation 1114, based on the bitmap, determine whether the first level subchunk contains a second level subchunk that includes the corresponding data.

Figure 12:
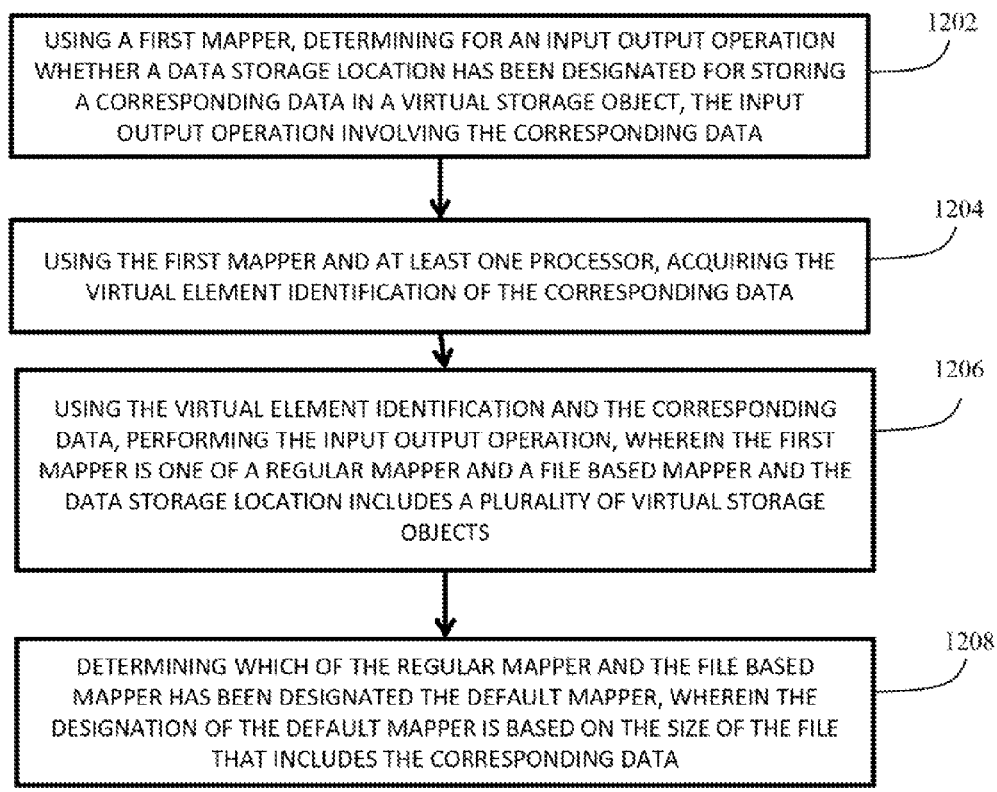

In operation 1202 of FIG. 12, using a first mapper, the system determines for an input output operation whether a data storage location has been designated for storing a corresponding data in a virtual storage object, the input output operation involving the corresponding data.

In operation 1204, using the first mapper and at least one processor, the system acquires the virtual element identification of the corresponding data.

In operation 1206, using the virtual element identification and the corresponding data, the system performs the input output operation, wherein the first mapper is one of a regular mapper and a file based mapper and the data storage location includes a plurality of virtual storage objects.

In operation 1208, the system determines which of the regular mapper and the file based mapper has been designated the default mapper, wherein the designation of the default mapper is based on the size of the file that includes the corresponding data.

Although the present embodiments have been described with reference to specific example embodiments, various modifications and changes can be made to these embodiments without departing from the broader spirit and scope of the various embodiments.

What is claimed is:

1. A mapping method of an accelerated application-oriented middleware layer, the method comprising:
　using a first mapper, determining for an input output operation whether a data storage location has been designated for storing, a corresponding data in a virtual storage object, the input output operation involving the corresponding data;
　using the first mapper and at least one processor, acquiring the virtual element identification of the corresponding data;
　using the virtual element identification and the corresponding data, performing the input output operation;
　wherein the first mapper is a passthrough mapper and the data storage location is a metachunk, the method further comprising:
　　when the corresponding data is stored in a passthrough virtual storage object and not in a cache virtual storage object, accessing the corresponding data from the passthrough virtual storage object;
　　creating a metachunk that has a metachunk virtual element identification, the metachunk being stored in the cache virtual storage object, wherein the metachunk includes the corresponding data and attributes; and
　　storing in the passthrough mapper an association between the corresponding data and the metachunk virtual element identification number.

2. The method of claim 1, further comprising:
creating a first level subchunk of the metachunk.

3. The method of claim 2, further comprising:
　creating a second level subchunk of the first level subchunk;
　storing the corresponding data in the second level subchunk.

4. The method of claim 1, wherein the first mapper is a cache mapper and the data location is a metachunk, the method further comprising:

when the corresponding data is stored in a metachunk of a cache virtual storage object, using a cache mapper and based on the offset of the corresponding data, determining whether the metachunk includes the appropriate first level subchunk for storing the corresponding data; and when the first level subchunk has been included, obtaining the virtual element identification of the first level subchunk.

5. The method of claim 4, the method further comprising:
obtaining a bitmap of the virtual element containing the first level subchunk; and
based on the bitmap, determining whether the first level subchunk contains a second level subchunk that includes the corresponding data.

6. The method of claim 1, wherein the first mapper is one of a regular mapper and a file based mapper and the data storage location includes a plurality of virtual storage objects, the method further comprising:
determining which of the regular mapper and the file based mapper has been designated the default mapper, wherein the designation of the default mapper is based on the size of the file that includes the corresponding, data.

7. The method of claim 6, further comprising:
when the file size is below a threshold and the default mapper is the regular mapper, using the regular mapper and information maintained within an application file object, identifying an appropriate virtual storage object from the plurality of virtual storage objects, the appropriate virtual storage object containing the corresponding data.

8. The method of claim 6, further comprising:
when the file size is above a threshold and the default mapper is the file based mapper, using the file based mapper and information maintained within a persistent file, identifying an appropriate virtual storage object from the plurality of virtual storage objects, the appropriate virtual storage object containing the corresponding data.

9. A computer system comprising:
a processor; and
a memory containing instructions that when executed on the processor, cause the processor to perform operations that, include:
using a first mapper, determining for an input output operation whether a data storage location has been designated for storing a corresponding data in a virtual, storage object, the input output operation involving the corresponding data;
using the first mapper and at least one processor, acquiring the virtual element identification of the corresponding data;
using the virtual element identification and the corresponding data, performing the input output operation; and
wherein the first mapper is a passthrough mapper and the data storage location is a metachunk, and the memory contains instructions that when executed on the processor cause the processor to perform operations that include:
when the corresponding data is stored in a passthrough virtual storage object and not in a cache virtual storage object, accessing the corresponding data from the passthrough virtual storage object;

creating a metachunk that has a metachunk virtual element identification, the metachunk being stored in the cache virtual storage object, wherein the metachunk includes the corresponding data; and storing in the passthrough mapper an association between the corresponding data and the metachunk virtual element identification number.

10. The method of claim 9, wherein the memory contains instructions that when executed on the processor cause the processor to perform operations that include:
creating a first level subchunk of the metachunk.

11. The computer system of claim 10, wherein the memory contains instructions that when executed on the processor cause the processor to perform operations that include:
creating a second level subchunk of the first level subchunk;
storing the corresponding data in the second level subchunk.

12. The computer system of claim 9, wherein the first mapper is a passthrough mapper, the data location is a metachunk, and the memory contains instructions that when executed on the processor cause the processor to perform operations that include:
when the corresponding data is stored in a metachunk of a cache virtual storage object, using a cache mapper and based on the offset of the corresponding data, determining whether the metachunk includes the appropriate first level subchunk for storing the corresponding data; and,
when the first level subchunk has been included, obtaining the virtual element identification of the first level subchunk.

13. The computer system of claim 12, wherein the memory contains instructions that when executed on the processor cause the processor to perform operations that include:
obtaining a bitmap of the virtual element containing the first level subchunk; and
based on the bitmap, determining whether the first level subchunk contains a second level subchunk that includes the corresponding data.

14. The computer system of claim 9, wherein the first mapper is one of a regular mapper and a file based mapper and the data storage location includes a plurality of virtual storage objects, and wherein the memory contains instructions that when executed on the processor cause the processor to perform operations that include:
determining which of the regular mapper and the file based mapper has been designated the default mapper, wherein the designation of the default mapper is based on the size of the file that includes the corresponding data.

15. The computer system of claim 14, wherein the memory contains instructions that when executed on the processor cause the processor to perform operations that include:
when the file size is below a threshold and the default mapper is the regular mapper, using the regular mapper and information maintained within an application file object, identifying an appropriate virtual storage object from the plurality of virtual storage objects, the appropriate virtual storage object containing the corresponding data.

* * * * *